(No Model.) 2 Sheets—Sheet 1.

R. P. CURTIS.
PIPE THREADING MACHINE.

No. 406,092. Patented July 2, 1889.

Witnesses
F. W. Gilhuley.
J. Williamson.

Inventor
Roderick P. Curtis
By J. N. Smith Jr.
Atty.

(No Model.) 2 Sheets—Sheet 2.

R. P. CURTIS.
PIPE THREADING MACHINE.

No. 406,092. Patented July 2, 1889.

Witnesses
F. W. Gilhuley.
S. Williamson.

Inventor
Roderick P. Curtis
By J. W. Smith
Atty.

UNITED STATES PATENT OFFICE.

RODERICK P. CURTIS, OF SOUTHPORT, ASSIGNOR TO CURTIS & CURTIS, OF BRIDGEPORT, CONNECTICUT.

PIPE-THREADING MACHINE.

SPECIFICATION forming part of Letters Patent No. 406,092, dated July 2, 1889.

Application filed February 25, 1889. Serial No. 301,155. (No model.)

*To all whom it may concern:*

Be it known that I, RODERICK P. CURTIS, a citizen of the United States, residing at Southport, in the county of Fairfield and State of Connecticut, have invented certain new and useful Improvements in Pipe-Threading Machines; and I do hereby declare the following to be a full, clear, and exact description of the invention, such as will enable others skilled in the art to which it appertains to make and use the same.

My invention has reference to certain new and useful improvements in pipe-threading machines, and has for its object to provide an exceedingly compact and simple machine of this description, and also to relieve the pipe-clamping jaws and ways from severe strain.

Figure 1:
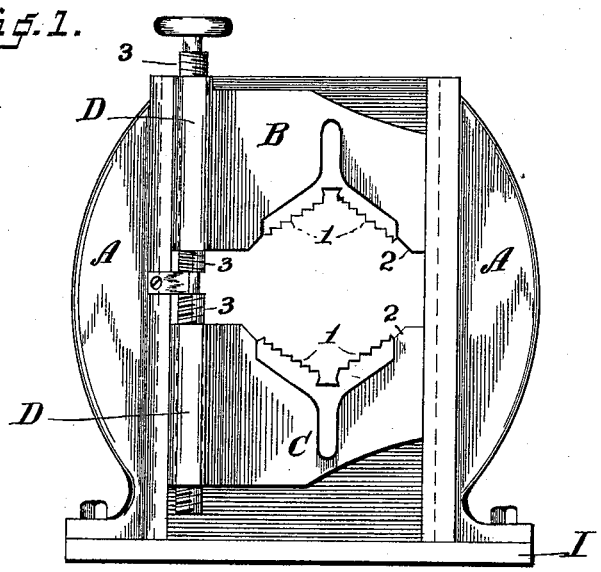
Figure 2:
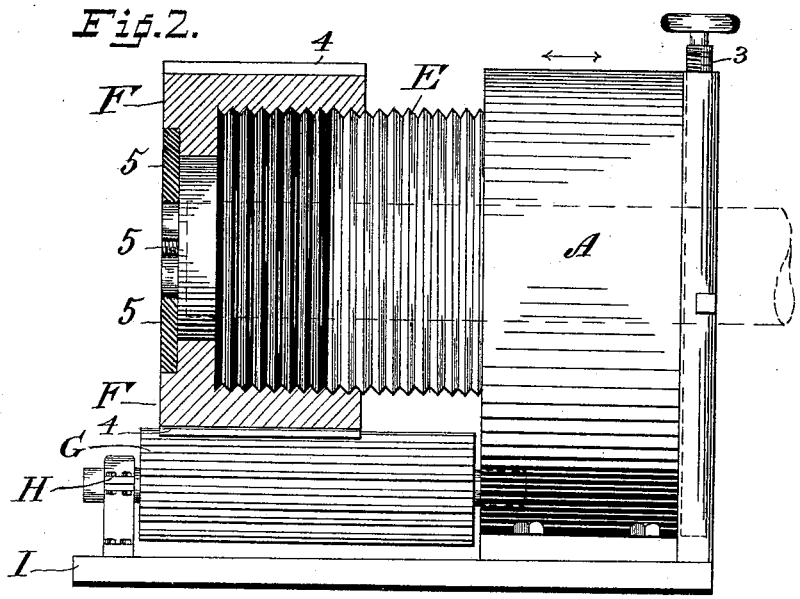
Figure 3:
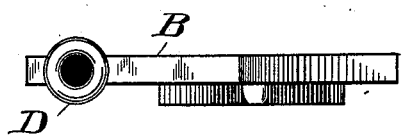

In the accompanying drawings, Figure 1 is an end elevation of my improvement, showing the construction of my clamping-jaws; Fig. 2, a side elevation with the nut in section; Fig. 3, a detail edge view of one of my clamping-jaws; and Fig. 4, a modification of my improvement similar to Fig. 2, but showing the nut stationary and the pipe-supporting element movable.

Similar letters denote like parts in the several figures.

A is the casing of a screw-cutting die-stock, to the face of which is attached the vise for holding the pipe or rod while it is being cut. The jaws B C of the vise are of ordinary construction, and slide in ways in the casing in the usual manner. Heretofore it has been essayed to relieve the jaws and ways by forming extensions at the forward ends of the jaws, so that there would be considerable bearing-surface at that point, and while these extensions prevented the forward ends of the jaws from cutting into the ways, so great a strain was thrown against the rear ways that the latter were cut into, and, moreover, the screw itself, which operated the jaws, sometimes became bent and unfit for use. I have ascertained by experiment that the best results are attained by giving to the front ends of the jaws bearings which extend a trifle beyond the biting-surfaces and forming long bearings and housings for the screw at the heels of the jaws. The long bearings at the front ends of said jaws are superfluous, and, moreover, give too great a leverage against the screw, and by extending the front bearings a short distance beyond the biting-surfaces 1, as shown at 2, I provide sufficient resistance to the side-thrust of the jaws; also by forming bearings extending the full length of the jaws at the heel ends thereof, and by making the screw-housings D as long as said bearings, I about equalize the thrust against the side ways at the front and rear of said jaws, while at the same time the manipulation of the screw 3 is facilitated, owing to the absence of leverage against it.

E is a threaded drum projecting from the rear of the casing A, and rigid therewith.

F is a nut, interiorly threaded and adapted to travel on said drum. The periphery of said nut is provided with cog-teeth 4, and any ordinary thread-cutters 5 are secured within the outer face of said nut.

G is a pinion journaled within the casing A, and a bearing H projecting upward from a bed-plate I. This pinion meshes with the cog-teeth of the nut F, and power is communicated in the usual way directly to this pinion, whereby the nut will be revolved, and consequently driven upon the drum E.

The pipe is held by the clamping-jaws within the casing A, and the travel of said nut toward said casing will cause the revolving thread-cutters 5 to thread the pipe.

I have shown the pipe in dotted lines in order to further the understanding of my invention. The casing A is secured upon the bed I, and the device as a whole is very compact, as will be seen from the drawings.

Figure 4:
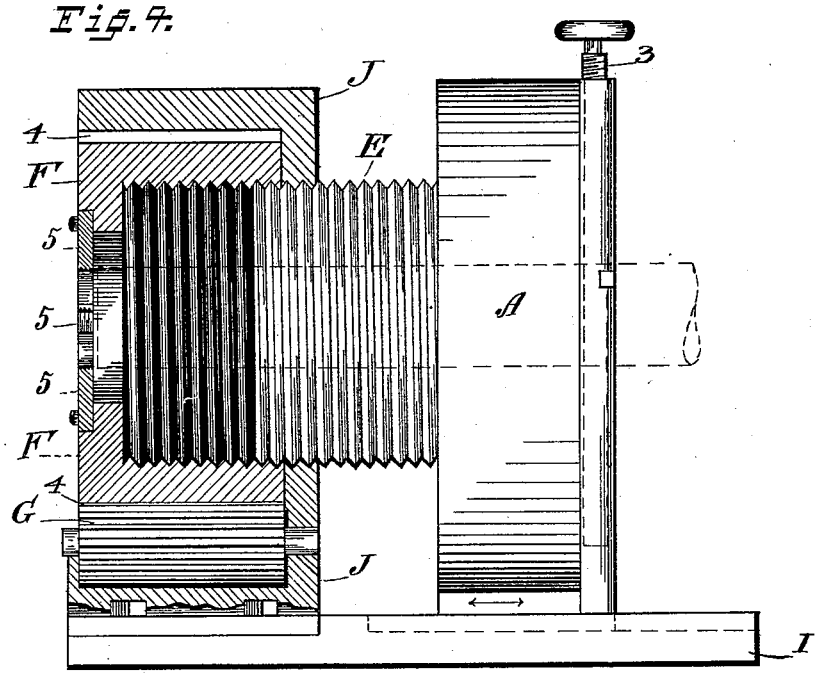

At Fig. 4 I have shown a modification of my invention, in which the casing carrying the pipe-holding jaws is adapted to travel on ways in the bed-plate, the nut being secured as against longitudinal movement within a standard J, rigid with the bed-plate, and the pinion having bearings within said standard, and I therefore do not wish to be limited to the traveling nut in connection with the stationary pipe.

What I claim is—

In a pipe-threading machine, the pipe-clamping jaws having bearings within the casing, the front bearings being shorter than the rear bearings, and extended a slight distance beyond the grasping-points of the jaws, the heel ends of said jaws having elongated bearings and screw-housings extending the full length of said jaws, substantially as set forth.

In testimony whereof I affix my signature in presence of two witnesses.

RODERICK P. CURTIS.

Witnesses:
F. W. SMITH, Jr.,
F. W. GILHULEY.